US007641386B2

(12) United States Patent
Chen et al.

(10) Patent No.: US 7,641,386 B2
(45) Date of Patent: Jan. 5, 2010

(54) DISPLAY DEVICE AND METHOD FOR STARTING UP AT A LOW TEMPERATURE

(75) Inventors: Fang-Tien Chen, Taoyuan County (TW); Fu-Jen Chiang, Taoyuan County (TW); Chang-Hsien Fan, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 49 days.

(21) Appl. No.: 11/417,632

(22) Filed: May 4, 2006

(65) Prior Publication Data

US 2007/0140316 A1 Jun. 21, 2007

(30) Foreign Application Priority Data

Dec. 16, 2005 (TW) .............................. 94144826 A

(51) Int. Cl.
*G01K 1/12* (2006.01)

(52) U.S. Cl. ........................... 374/141; 374/5; 345/156; 349/5; 349/64

(58) Field of Classification Search ................. 374/141, 374/4, 5; 349/20, 22, 72, 64; 219/627, 635, 219/201, 261, 538
See application file for complete search history.

(56) References Cited

U.S. PATENT DOCUMENTS

| | | | | |
|---|---|---|---|---|
| 2,006,306 | A * | 6/1935 | Wile | 236/1 C |
| 5,164,849 | A * | 11/1992 | Evans et al. | 349/72 |
| 5,523,873 | A * | 6/1996 | Bradford et al. | 349/139 |
| 5,584,554 | A * | 12/1996 | Moore et al. | 353/122 |
| 5,748,269 | A * | 5/1998 | Harris et al. | 349/58 |
| 5,754,153 | A * | 5/1998 | Mizutome et al. | 345/97 |
| 6,003,015 | A * | 12/1999 | Kang et al. | 705/15 |
| 6,020,867 | A * | 2/2000 | Shimada et al. | 345/87 |
| 6,072,459 | A * | 6/2000 | Asakawa et al. | 345/101 |
| 6,089,751 | A * | 7/2000 | Conover et al. | 374/183 |
| 6,137,794 | A * | 10/2000 | Brown | 370/360 |
| 6,219,113 | B1 * | 4/2001 | Takahara | 349/42 |
| 6,567,080 | B1 * | 5/2003 | Otsuka | 345/211 |
| 6,886,942 | B2 * | 5/2005 | Okada et al. | 353/52 |
| 6,961,035 | B2 * | 11/2005 | Endo et al. | 345/87 |
| 7,036,939 | B2 * | 5/2006 | Cole et al. | 353/52 |
| 7,040,762 | B2 * | 5/2006 | Yasuda | 353/52 |
| 7,226,352 | B2 * | 6/2007 | Oh | 454/184 |
| 7,336,411 | B2 * | 2/2008 | Miyagaki et al. | 359/279 |
| 7,384,154 | B2 * | 6/2008 | Gohman et al. | 353/57 |
| 7,556,383 | B2 * | 7/2009 | Utsunomiya | 353/61 |
| 2003/0020884 | A1 * | 1/2003 | Okada et al. | 353/57 |
| 2004/0164946 | A1 * | 8/2004 | Cavanaugh et al. | 345/101 |
| 2005/0117077 | A1 * | 6/2005 | Utsunomiya | 349/5 |
| 2006/0092383 | A1 * | 5/2006 | Vinson et al. | 353/69 |
| 2009/0040475 | A1 * | 2/2009 | Sagawa | 353/85 |

FOREIGN PATENT DOCUMENTS

JP 54122138 A * 9/1979

(Continued)

*Primary Examiner*—Gail Verbitsky
(74) *Attorney, Agent, or Firm*—Patterson, Thuente, Skaar & Christensen, P.A.

(57) ABSTRACT

A display device and a method for starting up at a low temperature utilizing a heating unit of the display device or an external heating unit to increase the environmental temperature of the display device are disclosed. After the environmental temperature inside the display device reaches a starting-up temperature, the display device can be started up in the low-temperature environment.

10 Claims, 2 Drawing Sheets

FOREIGN PATENT DOCUMENTS

| | | | | |
|---|---|---|---|---|
| JP | 0354122138 | A | * | 9/1979 |
| JP | 2002006392 | A | * | 1/2002 |
| JP | 2002040562 | A | * | 2/2002 |
| JP | 2003074868 | A | * | 3/2003 |
| JP | 2005148622 | A | * | 6/2005 |
| JP | 2007328005 | A | * | 12/2007 |

* cited by examiner

DISPLAY DEVICE AND METHOD FOR STARTING UP AT A LOW TEMPERATURE

CROSS-REFERENCES TO RELATED APPLICATIONS

This application claims priority to Taiwan Patent Application No. 094144826 filed on Dec. 16, 2005.

BACKGROUND OF THE INVENTION

1. Field of the Invention

The present invention relates to a display system, especially to a projection display device and a method for starting up at a low temperature.

2. Descriptions of the Related Art

With the international commerce being flourishing, products are not localized around the place of production. On the contrary, cheap and fine products could possess more global competitiveness and be more popular under the trend of internationalization. However, the local customs, geographical features, and the climate are different all over the world. Thus, it is essential to adjust products to meet different requirements among different places. Among that the factors we should consider, the influence caused by climate is an important one. Since climates in the world are diverse in different places and may be cold, hot, dry or humid, the functions of products are frequently affected in different environments. Especially for the delicate electronic products, they contain various electronic components with various standards of working temperature. Temperature variations in different operating environments could be one of the critical factors to determine whether the electronic products are operating normally or not.

Take a projection display device for example, there are a plurality of electronic components disposed in the projection display device on the market. Each electronic component has a certain range of working temperature. The functions of the component may be abnormally operated in the environmental temperature which is out of the range of working temperature. Especially, the projection display device possesses a few key components which have to be started up normally in a working temperature higher than 10° C. to proceed with the subsequent operations. If the components are started up in an environmental temperature lower than the normal standards, some abnormal actions would be caused and the components would not recover to work normally even the environmental temperature has risen back to the specification temperature thereof.

Thus, a device and a method designed for starting up a projection display device at a low temperature are badly needed for ensuring the products normally operated in a cryogenic environment.

SUMMARY OF THE INVENTION

According to the above-mentioned issues, the primary object of this invention is to provide a display device for starting up at a low temperature. The display device comprises a heating unit, a temperature detecting unit and a control unit, wherein the heating unit is utilized to rise an environmental temperature in the display device, and the temperature detecting unit is utilized to detect the environmental temperature in the display device and to generate a temperature signal to the control unit. The display device could be started up after the temperature signal reaches a starting-up temperature of the display device for ensuring the display device to be operated regularly.

Another object of this invention is to provide a projection device for starting up at a low temperature. The projection device comprises at least a lamp, a temperature detecting unit and a control unit. The lamp is utilized to rise the environmental temperature in the projection device and also acts as a projecting light source of the projection device. The temperature detecting unit is utilized to detect the environmental temperature in the projection device and to generate a temperature signal. The control unit is utilized to start up the lamp and to receive the temperature signal. The projection device could be started up after the temperature signal reaches a starting-up temperature of the projection device for ensuring the projection device to be operated regularly.

Yet a further object of this invention is to provide a method for starting up a display device at a low temperature which comprises the steps of:

starting up a power supply of the display device;

starting up at least a heat generator of the display device for raising an environmental temperature in the display device;

starting up a temperature detecting unit of the display device;

using the temperature detecting unit to detect the environmental temperature; and starting up the display device when the environmental temperature is higher than a starting-up temperature of the display device.

Furthermore, the method of the present invention could be applied to a projection display device, for example, a rear projection display device or a front projector, as a method for starting up at a low temperature.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
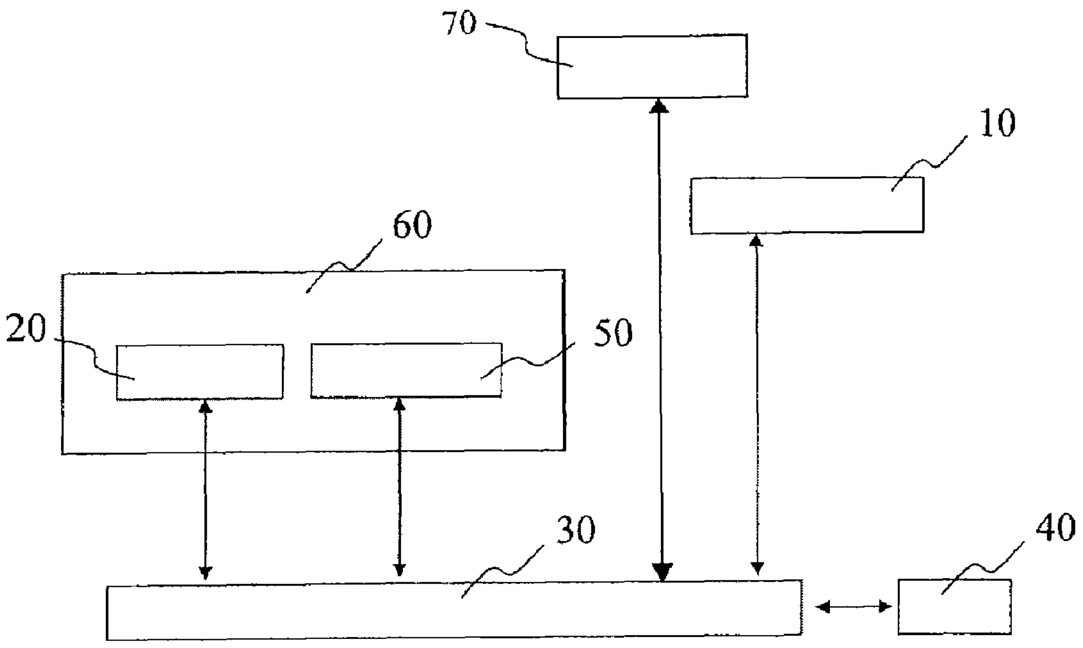
FIG. 1 is a schematic view illustrating a display device of the present invention.

A schematic view illustrating a display device applying the techniques of the present invention is shown in FIG. 1. For easy illustration, merely the elements relating to the present invention are shown in the figure. As mentioned, the display device of the present invention usually includes few key components which are not suitable for starting up at a low temperature. If the display device is started up at a low temperature and causes abnormality on the key components, the key components would not return to the normal status and cause the whole display device abnormal, even though the environmental temperature subsequently rises above the lowest working temperature of the key components.

In order to solve the problem of starting up at a low temperature, the display device, underlying the present invention, comprises a heating unit 10, a temperature detecting unit 20, a control unit 30, a memory 40, a key electronic component 50 and a circuit board 60, as shown in FIG. 1.

In FIG. 1, the heating unit 10 is utilized to rise the environmental temperature in the display device. The heating unit 10 could be either a built-in heat generator in the display device or an external heat generator. In a preferred embodiment of the present invention, the heat generator could be a built-in lamp or a plurality of built-in lamps disposed in the display device. The lamp could also be an illuminant or a projecting light source of the display device concurrently because the lamp plays the role of a light source of the display device or projecting light concurrently, which is with a feature of generating heat. Thus, the lamp is extremely suitable to act as a heating unit in the present invention. The environmental temperature could be efficiently risen by the lamp without adding other component into the original display device.

Moreover, the temperature detecting unit 20 illustrated in FIG. 1 is utilized to detect the environmental temperature in the display device and simultaneously to generate a temperature signal to the control unit 30 in response to the environmental temperature. More specifically, the temperature detecting unit 20 comprises one or a plurality of temperature sensors disposed adjacent to the key components in the display device. For example, if a key electronic component 50 disposed on a circuit board 60 must be operated normally only in an environment in which the temperature is higher than 10° C. for ensuring the display device working normally, the temperature detecting unit 20 would better be disposed adjacent to the key electronic component 50 on the circuit board 60, in point of the element disposition, for detecting the environment temperature variation around the key electronic component 50.

According to the above, the control unit 30 of the display device of the present invention electrically connects to the heating unit 10 and the temperature detecting unit 20, for staffing up the heating unit 10 and receiving the temperature signal generated from the temperature detecting unit 20. More particularly, the control unit 30 is utilized to start up the heating unit 10 before the whole display device is started up for gradually raising the environmental temperature in the display device. During the process of raising the environmental temperature, the control unit 30 captures the temperature signal generated from the temperature detecting unit 20 in a specific time to get environmental temperature variations around the key electronic component 50. After the temperature signal indicates that the environmental temperature around the key electronic component 50 reaches the lowest working temperature of the key electronic component 50 of the display device, the control unit 30 could start up the display device for ensuring subsequent normal operations.

In a specific embodiment, the control unit 30 could be a micro-controller to progress the above-mentioned controlling procedures. In addition, the display device further comprises a memory unit 40 storing a control program of the control unit 30 for driving the control unit 30 before the display device is started up to facilitate the subsequently starting-up procedures at a low temperature.

Figure 2:
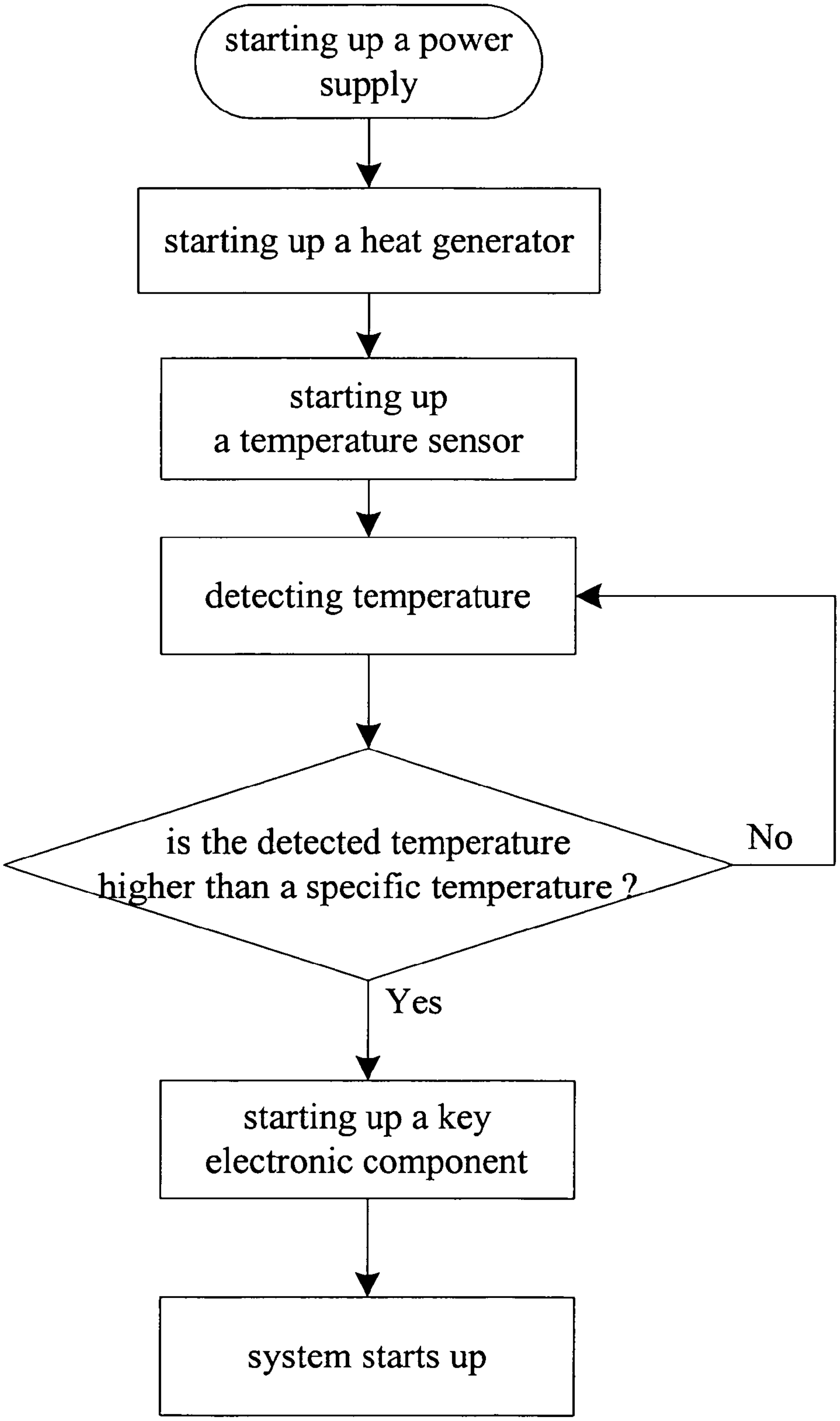
FIG. 2 illustrates a flow chart of the present invention for starting up a display device at a low temperature.

Furthermore, the present invention, as shown in FIG. 2, also provides a method for starting up a display device at a low temperature which comprises the steps of:

starting up a power supply of the display device;

starting up at least a heat generator of the display device for raising an environmental temperature in the display device;

starting up a temperature detecting unit of the display device;

using the temperature detecting unit to detect the environmental temperature; and starting up the display device when the environmental temperature is higher than a starting-up temperature of the display device.

It is noted that in order to rise the environmental temperature in the display device quickly and uniformly, at least a fan 70 is disposed in the display device of the present invention. The fan 70 is utilized to rapidly homogenize the temperature of the flow field in the display device when the heating unit starts working. Moreover, in a preferred embodiment of the present invention, the display device applying the present invention is a projection display device, for example, a rear projection display device or a front projector.

The above disclosure is related to the detailed technical contents and inventive features of the subject invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection device for starting up at a low temperature, comprising:

at least a lamp for raising an environmental temperature in the projection device and also acting as a projecting light source of the projection device;

a temperature detecting unit for detecting the environmental temperature in the projection device and generating a temperature signal;

at least a fan for raising the environmental temperature in the projection device; and a control unit for receiving the temperature signal, starting up the lamp and the fan prior to the temperature signal indicating that the environmental temperature has reached a starting-up temperature, and starting up the projection device when, or after, the temperature signal indicates that the environmental temperature has reached a starting-up temperature of the projection device.

2. The projection device as claimed in claim 1, further comprising a memory unit for storing a control program to drive the control unit.

3. The projection device as claimed in claim 1, wherein the temperature detecting unit comprises at least a temperature sensor.

4. The projection device as claimed in claim 1, wherein the starting-up temperature is a lowest working temperature of the projection device.

5. A method for starting up a projection device at a low temperature, comprising the steps of:

starting up a power supply of the projection device;

starting up at least a lamp of the projection device for raising an environmental temperature in the projection device;

providing at least a fan for raising the environmental temperature in the projection device; wherein the lamp and the fan are started up prior to a temperature signal indicating that the environmental temperature has reached a starting-up temperature;

starting up a temperature detecting unit of the projection device;

using the temperature detecting unit to detect the environmental temperature; and starting up the projection device when the environmental temperature is higher than the starting-up temperature of the projection device.

6. The method as claimed in claim 5, wherein the projection device further comprises a control unit for starting up the lamp, the temperature detecting unit and the projection device.

7. The method as claimed in claim 5, wherein the projection device further comprises a memory unit for storing a control program to drive the control unit.

8. The method as claimed in claim 5, wherein the at least a lamp acts as a projecting light source in the projection device.

9. The method as claimed in claim 5, wherein the temperature detecting unit comprises at least a temperature sensor.

10. The method as claimed in claim 5, wherein the starting-up temperature is a lowest working temperature of the projection device.

* * * * *